United States Patent [19]

Forward et al.

[11] 4,113,668

[45] Sep. 12, 1978

[54] ALKYL VINYL COPOLYMER

[76] Inventors: Cleve H. Forward, 1803 Duquain; Jerry G. Higgins, Sterling City Rte., both of Big Spring, Tex. 79720

[21] Appl. No.: 655,205

[22] Filed: Feb. 4, 1976

Related U.S. Application Data

[62] Division of Ser. No. 552,560, Feb. 24, 1975, Pat. No. 3,957,911.

[51] Int. Cl.$^2$ .............................................. C08J 9/18
[52] U.S. Cl. .................................... 521/60; 526/347; 521/146
[58] Field of Search ................. 526/347; 260/2.5 HB, 260/2.5 B

[56] References Cited

U.S. PATENT DOCUMENTS

| | | | |
|---|---|---|---|
| 3,009,888 | 11/1961 | Mueller-Tamm et al. | 260/2.5 B |
| 3,157,624 | 11/1964 | De Vries | 526/347 |
| 3,287,331 | 11/1966 | Lee | 526/347 |
| 3,790,483 | 2/1974 | Song | 526/347 |
| 3,864,319 | 2/1975 | Gaylord | 526/347 |
| 3,926,882 | 12/1975 | Henk et al. | 526/347 |
| 3,954,720 | 5/1976 | Spoor et al. | 526/347 |
| 3,957,911 | 5/1976 | Higgins et al. | 260/2.5 B |
| 3,962,197 | 6/1976 | Khanna | 526/347 |
| 4,029,869 | 6/1977 | Ingram et al. | 526/347 |

*Primary Examiner*—Morton Foelak

[57] ABSTRACT

A suspension copolymer of a higher alkyl vinyl and a vinyl benzene compound, said alkyl vinyl having from 14 to 60 carbon atoms.

15 Claims, No Drawings

ALKYL VINYL COPOLYMER

CROSS REFERENCE TO RELATED APPLICATION

This is a divisional continuation-in-part application of copending application Ser. No. 552,560 filed Feb. 24, 1975, now U.S. Pat. No. 3,957,911.

BACKGROUND OF THE INVENTION

The present invention relates to suspension polymerized copolymers of an alkyl vinyl monomer with styrene and to rubber-modified impact-resistant compostions comprised thereof; more particularly, to a copolymer of a monomeric higher alkyl vinyl compound and styrene graft polymerized under suspension polymerization conditions with a pure preformed rubber; and, to the method for preparing these products by suspension polymerization.

According to the present invention, in a first aspect, it is found that styrene having its polymeric backbone modified as a copolymer with a minor quantity, less than about 15%, of a monomeric alkyl vinyl compound has a built-in lubricating effect, superior in easy-flow molding to more perfect castings at lower molding pressures. The copolymer exhibits better stability of its lubricating properties in storage, being resistant to variations which occur over long storage periods and constitute a common fault of crystal polystyrene particles which have been blended with extraneously added lubricants for molding. It is found moreover that this copolymer comprising the monomeric higher alkyl vinyl compound will expand with a foaming agent to a foam with smaller cells, a substantial advantage over many foamed products formed from expandable polystyrene.

In a second aspect, the invention pertains to copolymers of a higher alkyl vinyl and styrene formed by suspension polymerization in the presence of preformed rubber particles, whereby the copolymer graft polymerizes to the rubber, forming superior high impact copolymer beads, which are easily moldable, with good flow characteristics, as well as of superior impact resistance.

SUMMARY OF THE INVENTION

Applicant's copolymers are essentially suspension polymerization copolymers of monomeric styrene with a minor quantity, such as about 0.25 to 15%, preferably about 0.5 to 6% by weight, of a higher alkyl vinyl compound based on the weight of the copolymer without rubber. Where the final polymer is the ternary polymer including preformed rubber, the polymeric composition will be comprised of from about 0.25 to 10% of such higher alkyl vinyl, from about 2.0 to 10% of preformed rubber, with the remainder being substantially styrene, copolymerized in suspension polymerization with the higher alkyl vinyl, and graft polymerized, typically both as polymer and copolymer, to the preformed rubber.

Minor quantities of other components are usually added to the suspension copolymerization to aid formation of the polymeric product as well as to improve its molding properties, namely small quantities of catalysts, such as free radical catalysts, typically an organic peroxy compound of the formula

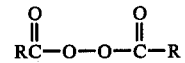

in which R is hydrocarbon, may be used, such as benzoyl peroxide. Suspension agents, typically fine particles of alkaline earth metal phosphates such as calcium phosphate, surface-active agents such as higher alkyl surfates typically dodecyl benzene sulfonate; polymer chain modifiers, typically alkyl mercaptans; and extra mineral lubricating oil may be present, generally in small quantities ranging from about 0.01% up to about 5%. Such additives serve to control the suspension polymerization and will generally be used in quantities of less than about 1%. Use of mineral lubricating oil is optional, and it may be present in quantity of about 1 to 5%.

The higher alkyl vinyl is a monomeric 1-olefin having at least 14 carbon atoms and containing up to about 60 carbon atoms, though preferably it will contain from about 16 to 26 carbon atoms. the styrene is the conventional monomer composition well known for producing styrene polymer compositions. It may be replaced in whole as in part with other equivalent vinyl aromatics, typically vinyl toluene, vinyl xylene, vinyl ethyl benzene and alpha-methylstryene to form similar polymeric products, in a manner well known in the art.

In forming a rubber-modified impact-resistant product, it is usual to first dissolve the rubber particles in the styrene, mix the styrene monomer (containing the rubber) with the alkyl vinyl monomer, add the small quantity of additives, e.g., catalyst, lubricating agents, etc., generally without the suspending agents, and then heat preliminarily with agitation at a temperature below about 90° C. for 1–4 hours to initiate the polymerization as a mass prepolymerization reaction. The mass-prepolymer generally will be agitated until the reaction mixture becomes more viscous and inversion of the rubber occurs. After initial prepolymerization is completed, the prepolymer is suspended in water to which calcium phosphate particles have been added, the viscous liquid and water varying from 35 to 65% for either. Agitation of the suspension in water is continued with high speed mixing while slowly raising the temperature to the range of 95°–125° C. under the autogenous pressure developed in a closed container for a total period of 7–24 hours of polymerization time. At that point, the polymerization will have been completed to convert the polymer to small bead-like solids, the particles ranging in size from about 30–100 mesh U.S. Standard screen. The polymerization and heating are then discontinued, the settled particles are separated by decantation, washed with dilute acid such as 10% HCl, rinsed in water to neutrality and finally dried. This general process of suspension with mass prepolymerization is shown in U.S. Pat. No. 3,188,364. While it is preferred to prepolymerize before suspension polymerization, the entire reaction may be carried out as a normal suspension polymerization, such as shown in U.S. Pat. Nos. 3,047,534 to Dyer et al., 3,100,763 to Meek et al., and No. 3,068,192 to White, without preliminary mass polymerization of the mixed monomers. The disclosure of these patents is hereby incorporated by reference, in toto.

While nearly all commercial diene-based rubbers will improve the impact strength of the copolymer hereof, it is preferred to use a relatively pure polybutadiene rubber such as Poly SAR, a product of Polymer Corporation, in which the rubber is a polybutadiene having a 98% cis-1,4 content, the 1,2 vinyl content therein being less than 2%. This rubber is almost 100% soluble as a gel in styrene monomer. Other preferred rubbers are known as DIENE sold by the Firestone Tire & Rubber Company, for example, DIENE 55 having a 38% approximate cis-1,4 content and a narrow molecular weight range, and DIENE 35 having an approximate 32% cis-1,4 content and slightly lower MW range. The DIENE rubbers are typically alkyl lithium catalyzed and are described more fully in U.S. Pat. No. 3,317,918.

With respect to the reduction in cell size, foamed crystal styrene normally has cells ranging from 50-100 mμ; however, the cell size of the copolymers hereof will be reduced to the approximate range of 20-50 mμ by copolymerization of styrene with the higher alkyl vinyl compound.

As to impact resistance, it is well known in the art that this property varies with the quantity of rubber used. For example, whereas it is conventional to incorporate from about 2 to 20% rubber into the composition, typically from about 10-15% of graft polymerized rubber of the DIENE type is required to achieve and Izod impact strength of about 4-5 ft. lbs./in. in the product. The pressure of 0.5 to 10% of higher alkyl vinyl copolymerized with the styrene will enable achievement of an impact strength of about 4-6 ft. lbs./in. with a more moderate rubber content, e.g., about 6%.

Again, with respect to the above-mentioned inherent lubrication effect of the copolymers hereof, a copolymer containing from about 0.5 to 10% of higher alkyl vinyl exhibits a melt flow index which is more than doubled with respect to normal polystyrene. This copolymer may be polymerized to a higher molecular weight as a result of the copolymerized presence of the higher alkyl vinyl in the copolymer, and this imparts a lubrication effect built into its molecular structure, as well as higher impact resistance properties. Being self-lubricating during extrusion, the copolymer does not lose lubricant, as does an externally lubricated polymer in which the lubricant, such as mineral oil, is added by admixture. An external lubricant may be substantially lost during storage and extrusion.

Moreover, the modified higher alkyl vinyl impact, while having a correspondingly higher molecular weight, also has a higher stress-crack resistance, thereby being a much tougher polymer.

DESCRIPTION OF PREFERRED EMBODIMENTS

The following examples illustrate the practice of this invention:

EXAMPLE I

A reactor was charged with 100 parts of monomeric styrene, 4 parts of higher alkyl vinyl (octadecene-1), 73 parts water, 0.4 parts benzoyl peroxide as a catalyst, 0.7 parts finely powdered tricalcium phosphate and 0.04 parts dodecylbenzene sulfonate, all by weight.

The monomer solution was suspended by agitation with a mixer operated at 120 rpm, and the reactor was heated for 8 hours at 92°–125° C. After the polymerization was complete, the suspension product was removed from the reactor, acid washed and dried. The polymer had the following properties.
Melt flow g/10 min. = 29
Soln. Vis. = 14.6 cps
Izod impact = 0.6–0.9 ft. lb./in.
MW = 70,000–100,000

EXAMPLE II

The reactor of Example I was charged with 100 parts styrene, 73 parts water, 0.4 parts benzoyl peroxide catalyst, 0.7 parts tricalcium phosphate, 0.04 parts dedecylbenzene sulfonate and 0.5 parts of a higher alkyl vinyl (hexadecene-1). The monomer solution was suspended and heated for 8 hours at 92°–125° C. while stirring was similarly maintained at about 120 rmp.

After the polymerization was complete, the suspension product was removed from the reactor, acid washed and dried.

The polymer had the following properties:
grams/10 mins. = 22
Soln. Vis = 14 cps
Izod Impact = 0.6 ft. lb./in.
MW = 70,000–100,000

A sample of the crystalline polystyrene beads was expanded with pentane as an expanding agent to give foamed beads with cell sizes of 30–50 microns. A similar sample of crystalline polystyrene without the copolymerized alkyl vinyl compound gave cell sizes of 60–80 microns. The alkyl vinyl compound decreases the average cell size in the expanded polystyrene foam.

EXAMPLE III

A batch suspension process was carried out using the same formulation as in Example II except that 3 parts alkyl vinyl (octadecene-1) compound was used. The Izod impact was raised from 0.6 to approximately 1.0 ft. lb./in.

Polymer Properties grams/10 mins. = 8.2
Soln. Vis. = 19.8 cps
Aged Izod impact = 0.96 ft. lb./in.

EXAMPLE IV

A batch suspension process was carried out using the same formulation as the one described in Examples II and III except that 10 parts alkyl vinyl (octadecene-1) compound was used. The polymer properties were as follows:
grams/10 mins. = 26
Soln. Vis. = 12 cps
Aged Izod impact = 0.86 ft. lb./in.

It is apparent from Examples I–IV that the alkyl vinyl compound copolymerized with the styrene increases the flow characteristics of the impact and reduces the cell size of the foam.

EXAMPLES V THROUGH VIII

Examples V through VIII were run using the typical formulation described below:

| REAGENT | PARTS BY WEIGHT |
|---|---|
| Styrene | 100 |
| Rubber | 5–8 |
| Alkyl Vinyl (hexadecene-1) | 0.5 – 10 |
| Water | 80–100 |
| Suspending and chain transfer agents** | 3–4 |
| Benzoyl Peroxide catalyst | 0.1 – 0.3 |

**The chain transfer agent was tert-dodecyl mercaptan in a quantity of 0.5 parts; the suspending agents are the same as in Example I.

The procedure was carried out as described above in Examples I–IV except that the rubber was added to the formulation by dissolving it in the styrene monomer. The reaction conditions were the same except that the mixture was pre-heated to 92° C. for 1 hour en masse, with stirring, but without water, and then transferred to a suspension reactor containing water wherein the contents are stirred with heating up to 125° C.

EXAMPLE V

HIPS With 4.5 Parts Alkyl Vinyl (Octadecene-1) (6% Rubber used was Firestone Diene 35*)

Physical properties of the high impact polystyrene with 4.5 parts of octadecene-1 are the following:
grams/10 mins. = 2.4
Soln. Vis. = 16.1 cps
Aged Izod Impact = 6.88 ft. lb./in.
*Firestone DIENE 35 is a 32% cis-1,4 polybutadiene rubber made with butyl-lithium catalyst and a narrow molecular weight range.

EXAMPLE VI

HIPS with 2.5 Parts Alkyl Vinyl (Octadecene-1) (6% Rubber used was Firestone Diene 55**)
Physical Properties of Polymer:
grams/10 mins. = 8.3
Soln. Vis. = 15.9 cps
Aged Izod Impact = 2.24 ft. lb./in.
**Firestone DIENE 55 is a 38% cis-1,4 polybutadiene rubber made with a butyl lithium catalyst and a narrow molecular weight range.

EXAMPLE VII

HIPS With 5.8 Parts Alkyl Vinyl (hexadecene-1) (6% Rubber used was Polysar cis-rubber ***) Batch ran for two hours longer Physical Properties of Polymer:
grams/10 mins. = 0.54
Soln. Vis = 28 cps
Aged Izod Impact = 5.24 ft. lb./in.
***Polysar is a 98% cis-1,4 polybutadiene rubber made with a Ziegler type catalyst.

EXAMPLE VIII

HIPS with 1.9 Alkyl Vinyl (Octadecene-1) (6% Rubber used was Firestone Diene 35)

Physical Properties of Polymer:
grams/10 mins. = 6.4
Soln. Vis. = 19.6 cps
Aged Izod Impact = 2.10 ft. lb./in.

EXAMPLES IX THROUGH XIII

Examples IX through XIII were run in a reactor using the procedure of Examples V–VIII with the typical formulation described below.

| REAGENT | PARTS BY WEIGHT |
| --- | --- |
| Styrene | 100 |
| Rubber | 5–7 |
| Catalyst (peroxide) | 0.1 – 0.3 |
| Water | 95 |
| Suspension & chain transfer agents | 1.5 – 2 |
| Alkyl Vinyl | 0.5 – 10 |

EXAMPLE IX

HIPS With 2 Parts Alkyl Vinyl (hexadecene-1) (6% Rubber used was Firestone Diene 55)

Physical Properties of Polymer:
grams/10 mins. = 5.17
Soln. Vis. = 20.8 cps
Aged Izod Impact = 2.56 ft. lb./in.

EXAMPLE X

HIPS With 4 Parts Alkyl Vinyl (Octadecene-1) (7% Rubber used was Firestone Diene 35) (No chain transfer agent was used)

Physical Properties:
grams/10 mins. = 1.0
Soln. Vis. = 15.8 cps
Aged Izod Impact = 4.40 ft. lb./in.

EXAMPLE XI

HIPS With 5 Parts of Alkyl Vinyl (Octadecene-1) (6% Rubber used was Firestone Diene 55) (No chain transfer agent was used)

Physical Properties:
grams/10 mins. = 2.13
Soln. Vis. = 19.7 cps
Aged Izod Impact = 5.6 ft. lb./in.

EXAMPLE XII

HIPS With 4 parts of Alkyl Vinyl (Octadecene-1) (6% Rubber used was Firestone Diene 55) (30% more peroxide catalyst was used)

Physical Properties:
grams/10 mins. = 1.0
Soln. Vis. = 193.1 cps
Izod Impact = 6.44 ft. lb./in.

EXAMPLE XIII

HIPS with 3 Parts of Alkyl Vinyl (Octadecene-1) (6% Rubber used was Firestone Diene 55) (No chain transfer agent was used)

Physical Properties:
grams/10 mins. = 1.13
Soln. Vis. = 52.8 cps
Izod Impact = 6.32 ft. lb./in.

As illustrated by these examples, the alkyl vinyl monomer when copolymerized with styrene improves the flow characteristics of the polymer. The product now has built-in high flow characteristics. The impact strength of the copolymer consisting only of alkyl vinyl monomer and styrene is increased significantly from the usual value, of about 0.4, to about 1.0 ft. lbs./in. without other impact modifying components such as rubber. Addition of a foaming agent and expansion of the foamable styrene/alkyl vinyl copolymer yields an expanded polymer with about one-half the average cell size, ranging from about 20 to 50 m$\mu$ whereas ordinary crystal polystyrene would have an average cell size of from about 50–100 m$\mu$.

Ordinary rubbers of various types are known to increase the impact strength of polystyrene. For instance, GRS rubber (styrene-butadiene copolymer) is known to increase the impact strength of polystyrene to about 3 ft. lbs. per inch Izod notch with about a 6% rubber content, varying more or less with the variation in the rubber content. A pure high cis-1,4 polybutadiene rubber, i.e., one having a cis-1,4 content of at least about 25% typically from about 25 to 98%, more preferably of about 32 to 98%, will usually increase the impact strength in a styrene graft copolymer containing 6% rubber to about 4 ft. lbs./in., and this too, will increase or decrease with the rubber content. However, as the examples show, polybutadiene rubber in an even more preferred range of about 30–50% cis-1,4 content, and of a narrow molecular weight range such as the DIENE rubber sold by Firestone, for example, as DIENE 35 and DIENE 55, will increase the impact strength for styrene/alkyl vinyl copolymer containing 6% rubber to more than 5 and in some cases, as the examples show, more than 6 ft. lbs. per inch Izod impact strength, again varying somewhat with the rubber content. Another commercial pure polybutadiene rubber of 98% cis-1,4 content known as POLYSAR is also highly effective to form this impact. In general, the rubbers will be used in the range of about 2 to 10%, preferably about 4 to 8% based on the total polymer.

It will be noted that the alkyl vinyl compound hereof is a monomeric compound preferably having 16 to 26 carbon atoms, and preferably of straight chain, having the vinyl appearing in the 1-position thereof. The styrene polymer is a copolymer with the alkyl vinyl compound, and in the rubber-modified products of the invention this copolymer is graft polymerized to the rubber. The rubber used in each instance herein is a prepolymerized rubber, and it is added in admixture with the monomeric styrene and alkyl vinyl compound. It reacts to form a graft polymer with these monomeric species. The polybutadiene of intermediate cis-1,4 content, which is preferably formed by butyllithium catalysts, is of narrow molecular weight range and will substantially dissolve to a colloidal solution in the monomeric liquids to achieve a greatly improved polymer having the properties described.

It is preferred to prepolymerize the polymerization mixture en masse to achieve a prepolymer of intermediate viscosity, after which the polymerization is then completed in suspension.

Certain modifications will occur to those skilled in the art. Other suspending agents, chain transfer agents, and the like, may be used in the suspension polymerization as known in the art, and the styrene per se may be substituted by alkyl groups.

What is claimed is:

1. A random suspension copolymer suitable for molding consisting essentially of from about 0.25 to about 15% by weight of a 1-olefin monomer having from 14 to 60 carbon atoms and the balance of a vinyl aromatic compound prepared by forming a suspension of said 1-olefin and said vinyl aromatic compound in an admixture of water, a suspending agent, a free radical polymerization catalyst, and optionally a surfactant, with agitation, and then copolymerizing said 1-olefin and said vinyl aromatic compound at a temperature of from about 90° to 125° C. for a period of time sufficient to form small hard copolymer beads having a size of from about 30 to 100 mesh.

2. The product of claim 1, further including a foaming agent.

3. The product of claim 2, comprising a cellular product of said copolymer.

4. The copolymer of claim 1 wherein said vinyl aromatic compound is selected from the group consisting of styrene, vinyl toluene, vinyl xylene, vinyl ethyl benzene, and alpha-methylstyrene.

5. The copolymer of claim 4 wherein said vinyl aromatic compound is styrene.

6. The product of claim 4 further including a foaming agent.

7. The product of claim 5 wherein the 1-olefin is a straight chain monomer having from 16 to 26 carbon atoms.

8. The product of claim 7 wherein said 1-olefin is selected from the group consisting of octadecene-1 and hexadecene-1.

9. The copolymer of claim 5 wherein the 1-olefin is present in the copolymer in an amount of from about 0.5 to 6.0% by weight based upon the total polymer.

10. The copolymer of claim 1 further including about 0.01% to 5% by weight of a mineral lubricating oil.

11. A process for forming a random suspension copolymer suitable for molding consisting essentially of from about 0.25 to 15% by weight of a 1-olefin monomer having from 14 to 60 carbon atoms and the balance of a vinyl aromatic compound, comprising the steps of:
   (a) forming a suspension of said 1-olefin and said vinyl aromatic compound in an admixture of water, a suspending agent, a free radical polymerization catalyst, and optionally a surfactant with agitation; and,
   (b) copolymerizing said 1-olefin and said vinyl aromatic compound at a temperature of from about 90° to 125° C. for a period of time sufficient to form small hard copolymer beads having a size of from about 30 to 100 mesh.

12. The method as defined in claim 11, further comprising the steps of adding a foaming agent to said copolymer beads and expanding the copolymer beads to a cellular product.

13. The process of claim 11, wherein said suspension further includes an amount of mineral lubricating oil in an amount sufficient to produce copolymer beads having from about 0.01% to about 5% by weight mineral oil therein.

14. The process of claim 11, wherein the 1-olefin is present in the copolymer in an amount of from about 0.25 to 15% by weight based upon the total polymer.

15. The process of claim 11, wherein the 1-olefin is a straight chain monomer having from 16 to 26 carbon atoms.

* * * * *